(12) United States Patent
Randjelovic et al.

(10) Patent No.: US 12,353,174 B2
(45) Date of Patent: Jul. 8, 2025

(54) WATCH CASE COMPRISING A NEAR-FIELD COMMUNICATION DEVICE

(71) Applicant: The Swatch Group Research and Development Ltd, Marin (CH)

(72) Inventors: Zoran Randjelovic, Corcelles (CH); Jean-Daniel Etienne, Les Geneveys-sur-Coffrane (CH); Thierry Scordilis, Cormondrèche (CH)

(73) Assignee: The Swatch Group Research and Development Ltd, Marin (CH)

( * ) Notice: Subject to any disclaimer, the term of this patent is extended or adjusted under 35 U.S.C. 154(b) by 523 days.

(21) Appl. No.: 17/495,145

(22) Filed: Oct. 6, 2021

(65) Prior Publication Data
US 2022/0171345 A1 Jun. 2, 2022

(30) Foreign Application Priority Data
Nov. 30, 2020 (EP) .................................. 20210655

(51) Int. Cl.
| | |
|---|---|
| *G04G 21/04* | (2013.01) |
| *G04B 19/28* | (2006.01) |
| *G04G 17/08* | (2006.01) |
| *H01Q 1/27* | (2006.01) |
| *H04W 4/80* | (2018.01) |

(52) U.S. Cl.
CPC .......... *G04G 21/04* (2013.01); *G04B 19/283* (2013.01); *G04G 17/08* (2013.01); *H01Q 1/273* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 3,831,372 A | * | 8/1974 | Isono ..................... | G04B 37/11 368/291 |
| 5,798,984 A | | 8/1998 | Koch | |
| 2014/0085154 A1 | * | 3/2014 | Nagahama .............. | G01S 19/14 343/720 |

(Continued)

FOREIGN PATENT DOCUMENTS

| | | |
|---|---|---|
| CH | 713968 A2 | 1/2019 |
| CN | 101046676 | 10/2007 |

(Continued)

OTHER PUBLICATIONS

European Search Report issued May 4, 2021 in European Application 20210655.5, filed on Nov. 30, 2020, 3 pages (with English Translation of Categories of Cited Documents).

(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A watch case including a middle and a hollow bezel provided with a near-field communication device including at least one microcircuit connected to an antenna, the bezel being removably mounted on the middle and formed by an assembly of two lining elements that could define a housing within which the near-field communication device is arranged, the first and second lining elements of the bezel being assembled together with a reversible fastening device.

13 Claims, 3 Drawing Sheets

(56) References Cited

U.S. PATENT DOCUMENTS

| | | | |
|---|---|---|---|
| 2015/0124567 A1* | 5/2015 | Liao | G04G 21/04 |
| | | | 368/282 |
| 2016/0124396 A1 | 5/2016 | Choi et al. | |
| 2017/0003660 A1* | 1/2017 | David | G04R 60/08 |
| 2018/0190455 A1 | 7/2018 | Vuille et al. | |
| 2019/0271954 A1 | 9/2019 | Silvant et al. | |

FOREIGN PATENT DOCUMENTS

| | | |
|---|---|---|
| CN | 105361368 A | 3/2016 |
| CN | 106488717 A | 3/2017 |
| CN | 108259055 A | 7/2018 |
| CN | 111033392 A | 4/2020 |
| CN | 211630640 U | 10/2020 |
| EP | 0 844 685 A1 | 5/1998 |
| EP | 3 141 969 A1 | 3/2017 |
| EP | 3 343 450 A1 | 7/2018 |
| JP | 4294110 B2 | 7/2009 |
| KR | 200406111 Y1 | 1/2006 |

OTHER PUBLICATIONS

Japanese Office Action issued Jun. 28, 2022, in Japanese Patent Application No. 2021-170700 (with English translation), 5 pages.
Chinese Office Action issued in Chinese Patent Application No. 202111441111.2 on Jun. 14, 2024.

* cited by examiner

WATCH CASE COMPRISING A NEAR-FIELD COMMUNICATION DEVICE

CROSS-REFERENCE TO RELATED APPLICATION

This application claims priority to European Patent Application No. 20210655.5 filed on Nov. 30, 2020, the entire disclosure of which is hereby incorporated herein by reference.

TECHNICAL FIELD OF THE INVENTION

The invention relates to a watch case comprising a near-field communication device, as well as a watch equipped with such a case.

TECHNOLOGICAL BACKGROUND

Portable contactless payment objects such as watches that are adapted to participate to the completion of an electronic payment are known in the state of the art. Such watches conventionally include near-field communication means composed by an electronic chip, or integrated circuit, electrically connected to an antenna. Most of the time, these means do not need a standalone electric power supply and are intended to automatically communicate with a reader when they are brought close thereto. The electromagnetic field of the reader generates an induced current in the antenna which powers the chip and enables it to emit, in turn, a signal via the antenna.

Nonetheless, these near-field communication means have a service life limited by the life expectancy of the integrated circuit, more particularly by that of its "electronic safe" portion which should not exceed ten years. Indeed, once this duration has elapsed, these communication means no longer allow the completion of electronic payment and should therefore be replaced. Considering the particular arrangement of these communication means in these watches of the state of the art, the maintenance operations that should lead to such replacements are often complex, and even impossible, and also expensive as they might in particular require the replacement of other parts of the watch that are associated to these communication means.

The prior art does not offer a solution allowing overcoming such drawbacks, there is therefore a need for providing an alternative to the existing solutions.

SUMMARY OF THE INVENTION

The present invention aims to overcome the drawbacks of the prior art by proposing the provision of a watch whose case comprises a bezel that could be easily and rapidly dismounted to ensure maintenance of the near-field communication device contained thereby without impacting neither the integrity nor the water-resistance of the product.

For this purpose, an aspect of the invention relates to a watch case including a middle and a hollow bezel provided with a near-field communication device comprising at least one microcircuit connected to an antenna, said bezel being removably mounted on said middle and formed by an assembly of two lining elements that could define a housing within which said near-field communication device is arranged, said first and second lining elements of the bezel being assembled together by means of a reversible fastening device.

In other embodiments:
the reversible fastening device comprises a tightening element in particular a compressible seal;
the first lining element comprises a reversible fastening area comprising a groove defined on an outer peripheral wall of the first lining element;
said groove is configured so as to receive said tightening element;
said second lining element comprises a reversible connecting area that could cooperate by friction with a tightening element arranged in a groove comprised within the first lining element;
the bezel comprises a removable support element of the near-field communication device;
the support element comprises over its upper face a reception area in particular in an inclined plane that could receive said antenna;
the reception area of the support element comprises or is formed by a protective magnetic screen such as ferrite;
the support element comprises a recess within which said at least one microcircuit could be completely or partially arranged;
the support element comprises over its lower face at least two feet that could bear on an inner face of the second lining element of the bezel when this second lining element is assembled to the first lining element;
the first and second lining elements, the removable support element and the tightening element are made of at least one dielectric and/or electrically non-conductive material;
said bezel is fastened on the middle by means of at least one removable fastening element in particular a clipping-type one;
the near-field communication device comprises a sealing material coating that could make said device waterproof and/or moistureproof;
the near-field communication device is a contactless electronic payment device.

In another aspect, the invention relates to such a case comprising a near-field communication device.

Advantageously, the watch is water-resistant.

BRIEF DESCRIPTION OF THE FIGURES

The objects, advantages and features . . .

DETAILED DESCRIPTION OF THE INVENTION

Figure 1:
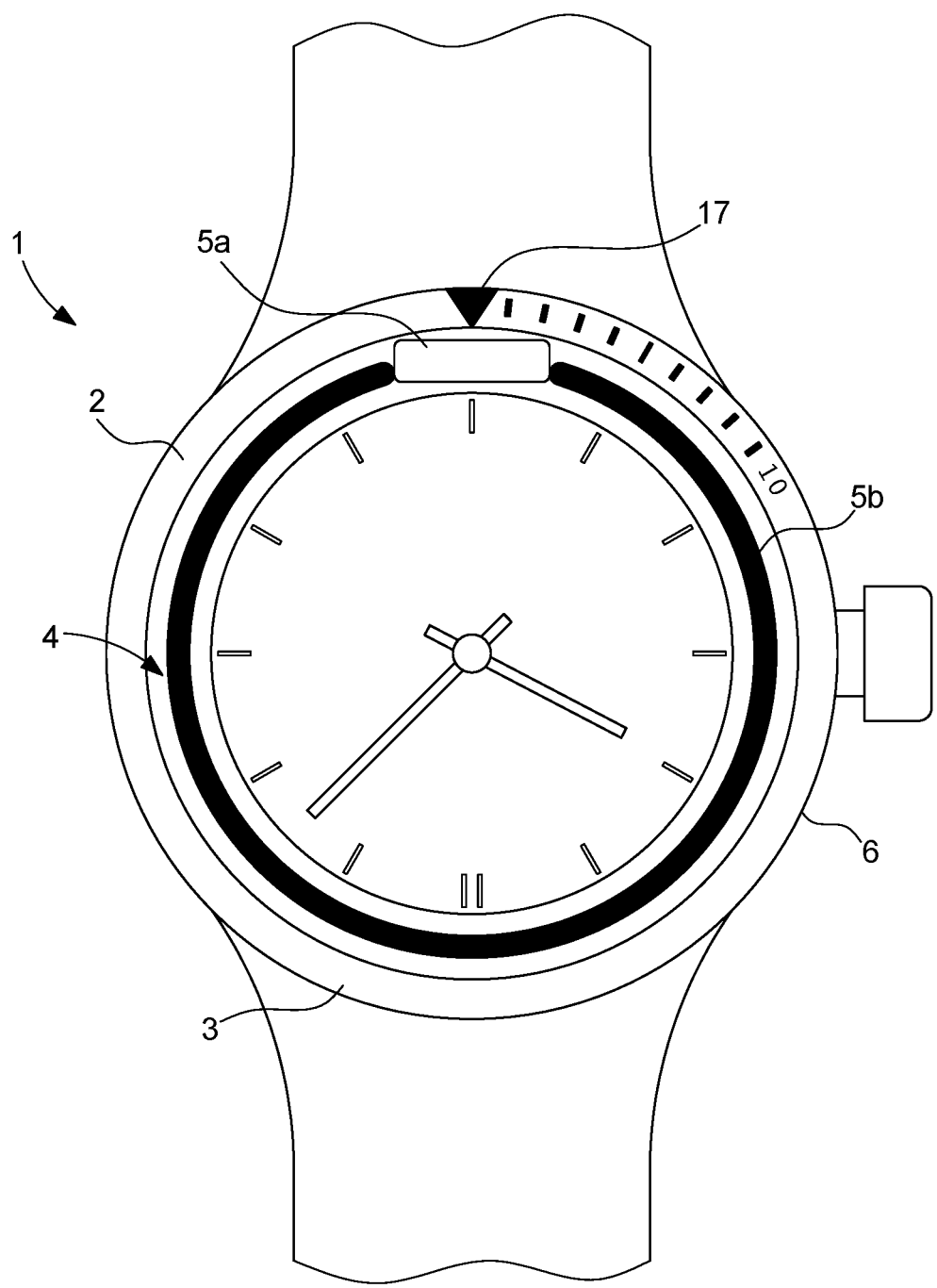
FIG. 1 is a schematic representation of a watch provided with a case comprising a bezel within which a near-field communication device is arranged, according to an embodiment of the invention.
Figure 2:
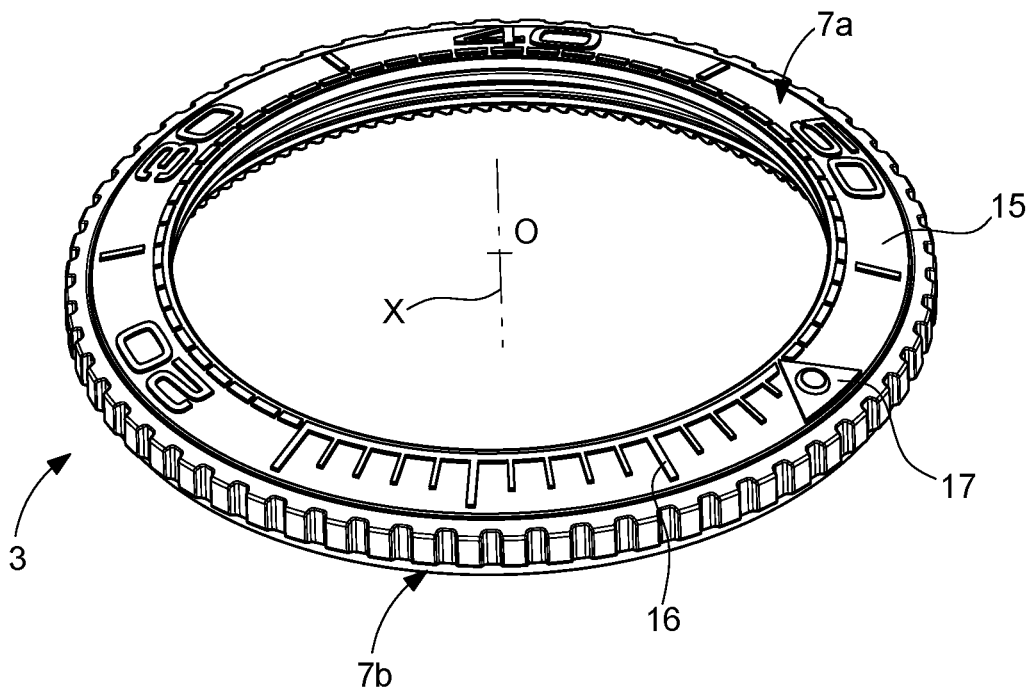
FIG. 2 is a top view of a perspective representation of the bezel, according to the embodiment of the invention.
Figure 3:
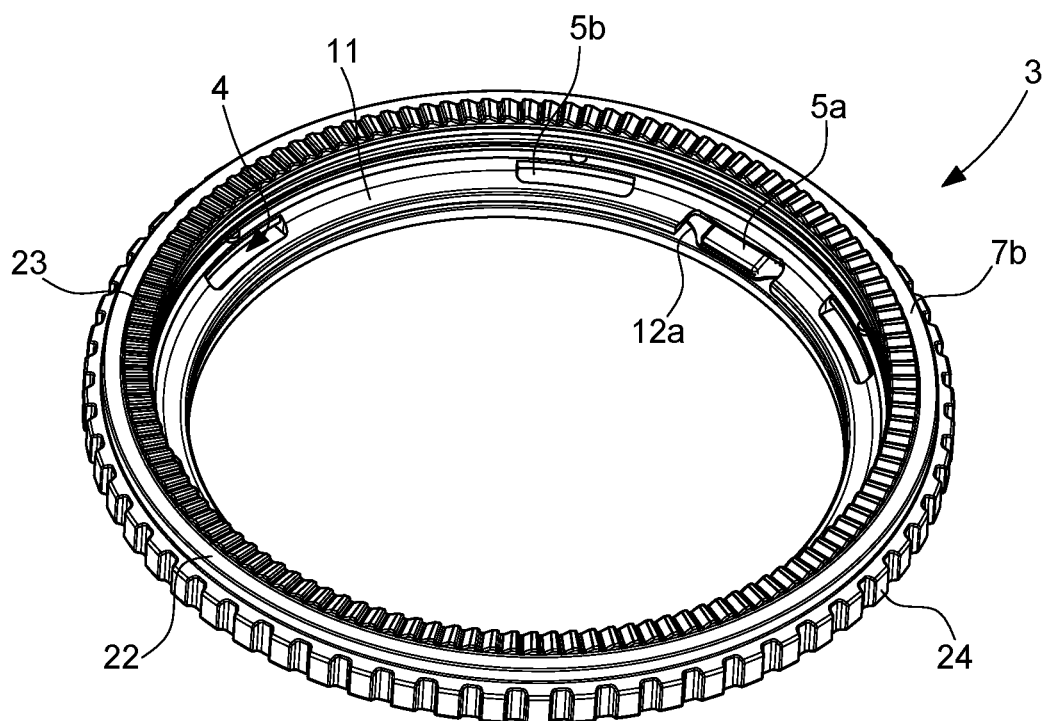
FIG. 3 is a bottom view of a perspective representation of the bezel, according to the embodiment of the invention.
Figure 4:
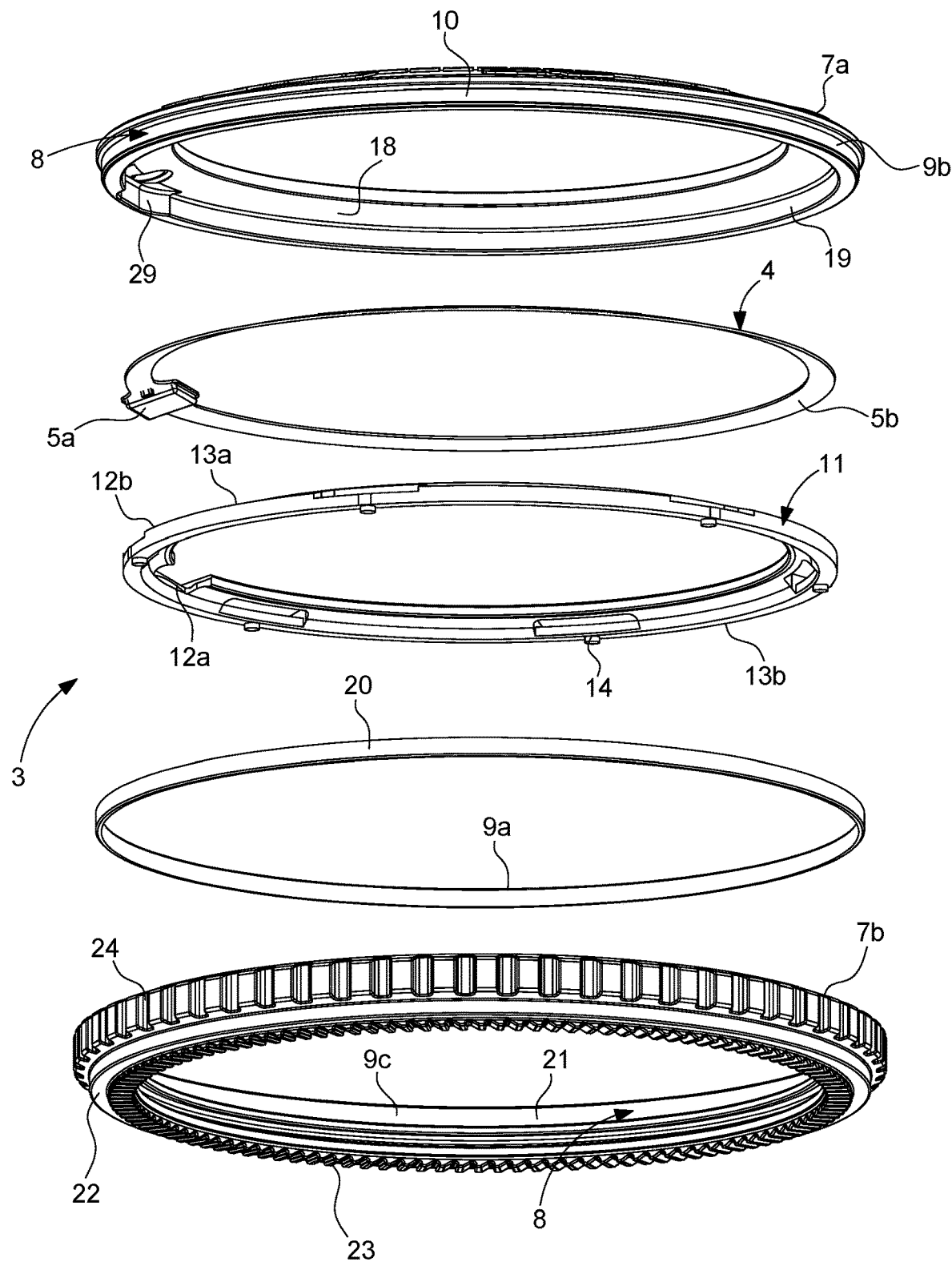
FIG. 4 is an exploded view of a perspective representation of the bezel, according to the embodiment of the invention.

FIG. 1 is a schematic representation of a watch 1 comprising a case 2 including a middle 6 and a hollow bezel 3 provided with a NFC-type (acronym of "Near Field Communication") near-field communication device 4. Such a near-field communication device 4 could participate to the completion of a contactless electronic payment. In this context, such a device 4 then consists of a contactless electronic payment device.

This near-field communication device 4 comprises at least one microcircuit 5a which may consist of an integrated circuit and an antenna 5b preferably circular-shaped which could be wound in an electrically-conductive material, such as copper or formed on a printed circuit (or PCB standing for "Printed Circuit Board") and which is connected to said microcircuit 5a.

In this configuration, the watch 1 according to the invention comprises a bezel 3 which could be easily dismounted/disassembled in particular to replace the near-field communication device 4 which might be defective and that being so, without damaging the bezel 3 and by extension the watch 1 case 2. In addition, this bezel 3 also participates in enabling the integration of such a device 4 in this watch 1 in a simpler and more economical manner. It should be noted that such a bezel 3 could be one-directional or bi-directional or be a non-rotating bezel.

This watch 1 may consist of a wrist watch or a mechanical watch or a smartwatch. This watch 1 may be water-resistant and in this configuration it could be a sports watch such as a diving watch.

In this watch 1, the case 2 primarily comprises a middle 6. The middle 6 may be made of metal (for example, steel, preferably stainless steel), or of a synthetic material (for example a composite material comprising a polymer matrix charged with fibres, typically carbon fibres) or of a dielectric, ceramic and/or electrically non-conductive material. As shown in FIG. 1, the middle 6 has a circular contour. The middle 6 defines an internal space configured so as to accommodate a clock movement. This middle 6 comprises horns on which a bracelet for wearing the watch 1 on the wrist is intended to be hooked. Excluding the horns, the middle 6 features a general axisymmetry around a central axis X.

Secondly, this watch 1 case 2 comprises the bezel 3 which is removably mounted on the middle 6. Indeed, this bezel 3 is mounted on this middle 6 by means of a removable fastening element, in particular a clipping- or nesting-type one. Such a fastening element allows assembling and disassembling the bezel 3 off the middle 6 easily, rapidly and simply without damaging them for example in order to ensure maintenance of the near-field communication device 4.

In FIGS. 1 to 4, this bezel 3 has an essentially annular shape. It comprises two lining elements 7a, 7b, a reversible fastening device 8 and a removable support element 11 of the near-field communication device 4. More specifically, this bezel 3 is formed by the assembly of the first lining element 7a with the second lining element 7b so as to define a housing within which the near-field communication device 4 is arranged. In particular, it should be noted that in this configuration, the support element 11 is sandwiched between these two lining elements 7a, 7b. In this bezel 3, the reversible fastening device 8 comprises a fastening area 9b and a connecting area 9c as well as a tightening element 9a that we will describe later on. It should be recalled that such a device 8 participates to the assembly of the first and second lining elements 7a, 7b by tightened nesting.

The first lining element 7a comprises an outer face 15 on which a graduation 16 is stuck up or formed. In the illustrated example, the graduation comprises indexes some of them are figurative and are in the form of digits (preferably Arabic digits). One of the indexes, called the zero index 17, is in the form of a triangle pointing towards the interior of this first lining element 7a, so as to form an origin marker from which the user measures, in minutes, the elapsed time from a predetermined initial time point corresponding to an accurate angular position of the bezel 3 with respect to the middle 6. This first lining element 7a also comprises an inner face 18, an inner peripheral wall 19 and an outer peripheral wall.

This first lining element 7a comprises an area 20 for arranging said at least one microcircuit 5a of the communication device 4 which is formed in both a portion of the inner peripheral wall 19 and a portion of the inner face 18. Preferably, this arrangement area 20 is located behind the zero index 17.

The first lining element 7a also comprises the reversible fastening area 9b comprising a groove 10 defined on its outer peripheral wall. Such a groove 10 is specifically configured to receive the tightening element 9a.

This tightening element 9a may consist of a compressible seal which has a smaller size than the perimeter (circumference) of the groove 10. Hence, such a tightening element 9a is arranged in the groove 10 by being stretched. Despite its smaller circumference, the tightening element 9a fits into this groove 10 thanks to its elastic properties, which enable it to be expanded and which once placed in the groove 10 will shrink so as to bear against the outer peripheral wall in the groove 10.

This reversible fastening area 9b is adapted to cooperate with the reversible connecting area 9c defined on an inner peripheral wall 21 of the second lining element 7b of the bezel 3. This connecting area 9c is adapted to cooperate with an outer surface 20 of the tightening element 9a mounted in the groove 10 of the fastening area 9b in order to reversibly link the first lining element 7a with the second lining element 7b. It should be noted that the connecting area 9c could cooperate by friction with the outer surface 20 of the tightening element 9a arranged in the groove 10.

In this configuration, the diameter connecting two points of the outer surface 20 of the tightening element 9a mounted on the first lining element 7a is substantially larger or strictly larger than the diameter connecting two points of the connecting area 9c of the second lining element 7b. It should be noted that the diameter connecting two points of the groove 10 of the first lining element 7a is substantially smaller or strictly smaller than the diameter connecting two points of the connecting area 9c of the second lining element 7b. Furthermore, it should be understood that the diameter of the first lining element 7a without the tightening element 9a, is substantially smaller or strictly smaller than that of the second lining element 7b.

The second lining element 7b comprises an inner face which is contiguous to its inner peripheral wall 21. In particular, this inner face is configured so as to serve as a bearing face of the support element 11 of the bezel 3 when the first and second lining elements 7a, 7b are assembled. This second lining element 7b includes an outer face 22 opposite to the inner face and which extends opposite the middle 6, and more specifically opposite a portion of the middle 6 intended for removable fastening of the bezel 3. This outer face 22 comprises a gear ring 23 of this bezel 3 which serves for angular indexing of the bezel 3 with respect to the middle 6. This gear ring 23 comprises a peripheral series of teeth where each tooth is asymmetrical and comprises an inclined ramp and a vertical stop surface, possibly connected by a horizontal plate.

This second lining element 7b is also provided with an outer peripheral wall on which a gripping area 24 of the bezel 3 is defined.

As we have mentioned, the bezel 3 comprises the removable support element 11 of the near-field communication device 4. More specifically, this support element 11 is provided with an upper face 13a including an area 12b for receiving the antenna 5b of said communication device 4. In particular, this reception area 12b on which said antenna 5b is arranged is comprised within an inclined plane. This support element 11 also comprises a recess 12a, or a through opening, within which all or part of said at least one microcircuit 5a could be arranged.

In one variant, the reception area 12b may comprise/form a protective magnetic screen such as ferrite by being covered with a layer of a ferrite-based material. In this context, the portion of the inner peripheral wall and the inner face of the second lining element 7b located proximate to said at least one microcircuit 5a, may also comprise such a material layer in order to form a magnetic screen with this support element 11.

Furthermore, this support element 11 comprises a lower face 13b comprising a plurality of feet 14 that could bear on the inner face of the second lining element 7b of this bezel 3 when this second lining element 7b is assembled to the first lining element 7a.

In this bezel 3, the first and second lining elements 7a, 7b, the tightening element 9a and the support element 11 are suited for the operation of the near-field communication device 4 by being manufactured in dielectric and electrically non-conductive materials, such as plastic, ceramic, or any other synthetic material.

Moreover, the communication device 4 comprises a sealing material coating which makes it waterproof and moistureproof. This material coating is also adapted to make it resistant to high pressures that might be encountered during dives performed by the wearer of the watch 1. This material coating may comprise organic or inorganic layers or a combination of these two types of layers.

It should be understood that various modifications and/or improvements obvious to a person skilled in the art could be made to the different embodiments of the invention disclosed hereinabove without departing from the scope of the invention defined by the appended claims.

The invention claimed is:

1. A watch case comprising:
a middle;
a hollow bezel; and
a near-field communication device having at least one microcircuit connected to an antenna,
wherein said bezel is removably mounted on said middle and formed by an assembly of a first and a second lining element that define a housing within which said near-field communication device is arranged,
wherein said first and second lining elements of the bezel are assembled together with a reversible fastening device, the reversible fastening device includes a compressible seal tightening element,
wherein the first lining element includes a reversible fastening area having an annular groove,
wherein the annular groove extends into an outer peripheral wall of the first lining element such that a first portion of the outer peripheral wall of the first lining element is located on a first side of the annular groove and a second portion of the outer peripheral wall of the first lining element is located on a second side of the annular groove opposite the first side, and a base of the groove has a diameter smaller than a diameter of each of the first portion of the outer peripheral wall and the second portion of the outer peripheral wall,
wherein an entirety of the compressible seal tightening element is positioned within the annular groove, and
wherein the tightening element is positioned between the first lining element and the second lining element.

2. The case according to claim 1, wherein said second lining element comprises a reversible connecting area that cooperates by friction with the tightening element arranged in the groove comprised within the first lining element.

3. The case according to claim 1, wherein the bezel comprises a removable support element of the near-field communication device.

4. The case according to claim 1, wherein the bezel comprises a removable support element comprising over its upper face a reception area that is an inclined plane configured to receive said antenna.

5. The case according to claim 1, wherein the bezel comprises a removable support element comprising over its upper face a reception area comprising or being formed by a protective magnetic screen made of ferrite.

6. The case according to claim 1, wherein the bezel comprises a removable support element comprising a recess within which said at least one microcircuit is completely or partially arranged.

7. The case according to claim 1, wherein the bezel comprises a removable support element comprising over its lower face at least two feet that bear on an inner face of the second lining element of the bezel when said second lining element is assembled to the first lining element.

8. The case according to claim 1, wherein the first and second lining elements, a removable support element and the tightening element are made of at least one dielectric and/or electrically non-conductive material.

9. The case according to claim 1, wherein said bezel is fastened on the middle with at least one removable clipping-type fastening element.

10. The case according to claim 1, wherein, the near-field communication device comprises a sealing material coating to waterproof and/or moistureproof the device.

11. The case according to claim 1, wherein the near-field communication device is a contactless electronic payment device.

12. A watch comprising the case according to claim 1.

13. The watch according to claim 12, wherein the watch is water-resistant.

* * * * *